(12) United States Patent
Mos et al.

(10) Patent No.: US 11,966,070 B2
(45) Date of Patent: Apr. 23, 2024

(54) LIGHT GUIDE AND A LIGHTING DEVICE COMPRISING A LIGHT GUIDE

(71) Applicant: SIGNIFY HOLDING B.V., Eindhoven (NL)

(72) Inventors: Barry Mos, Eindhoven (NL); Michel Cornelis Josephus Marie Vissenberg, Roermond (NL); Olexandr Valentynovych Vdovin, Maarheeze (NL); Johannes Petrus Maria Ansems, Hulsel (NL); Hugo Johan Cornelissen, Escharen (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 102 days.

(21) Appl. No.: 17/608,186

(22) PCT Filed: May 4, 2020

(86) PCT No.: PCT/EP2020/062238
§ 371 (c)(1),
(2) Date: Nov. 2, 2021

(87) PCT Pub. No.: WO2020/225172
PCT Pub. Date: Nov. 12, 2020

(65) Prior Publication Data
US 2022/0214490 A1    Jul. 7, 2022

(30) Foreign Application Priority Data
May 7, 2019 (EP) ..................... 19172985

(51) Int. Cl.
*F21V 8/00* (2006.01)
(52) U.S. Cl.
CPC ................. *G02B 6/0036* (2013.01)

(58) Field of Classification Search
CPC ............................ G02B 6/0036; G02B 6/0063
See application file for complete search history.

(56) References Cited

U.S. PATENT DOCUMENTS

| 5,771,328 A | 6/1998 | Wortman et al. |
| 2009/0046370 A1 | 2/2009 | Chang |

(Continued)

FOREIGN PATENT DOCUMENTS

| DE | 102006011296 A1 | 9/2007 |
| JP | 2015194628 A | 11/2015 |

(Continued)

*Primary Examiner* — Fatima N Farokhrooz

(57) ABSTRACT

A light guide (1) for a lighting device (8) is provided. The light guide (1) comprises an incoupling element (2) configured for receiving light and coupling the received light into the light guide (1). The light guide (1) is configured to convey the received light within the light guide (1). The light guide (1) comprises at least a first group and a second group of conically shaped outcoupling surface structures (3) distributed on, and recessed into or protruding from, a side (4) of the light guide (1). Each conically shaped outcoupling surface structure (3) is configured for coupling of light out of the light guide (1). Further, each conically shaped outcoupling surface structure (3) of the first group is geometrically characterized by a shape in accordance with a first cone or conical frustum (5) and each conically shaped outcoupling surface structure (3) of the second group is geometrically characterized by a shape in accordance with a second cone or conical frustum (6). The first cone or conical frustum (5) has (i) a height (1) different from a height (h2) of the second cone or conical frustum (6), and (ii) a base diameter (bd1) different from a base diameter (bd2) of the second cone or conical frustum (6). The first cone or conical frustum (5) has a height (h1) to base diameter (bd1) ratio in a range (Continued)

of 0.4 to 0.7. The second cone or conical frustum (6) has a height (h2) to base diameter (bd2) ratio in a range of 0.7 to 1.4.

12 Claims, 3 Drawing Sheets

(56) References Cited

U.S. PATENT DOCUMENTS

| | | | |
|---|---|---|---|
| 2009/0128735 | A1 | 5/2009 | Larson et al. |
| 2013/0063980 | A1 | 3/2013 | Ender |
| 2013/0100696 | A1 | 4/2013 | Brick et al. |
| 2013/0294064 | A1* | 11/2013 | McCaughan ........ G02B 6/0036 362/231 |
| 2019/0097092 | A1 | 3/2019 | Yamae |
| 2020/0049877 | A1* | 2/2020 | Watanabe ......... G02F 1/133606 |
| 2021/0041617 | A1* | 2/2021 | Watanabe ............. G02F 1/0107 |

FOREIGN PATENT DOCUMENTS

| | | | |
|---|---|---|---|
| KR | 20100100401 A | * | 9/2010 |
| WO | 2005090855 A1 | | 9/2005 |
| WO | 2011124294 A1 | | 10/2011 |
| WO | 2016178592 A1 | | 11/2016 |
| WO | 2018179614 A1 | | 10/2018 |

* cited by examiner

LIGHT GUIDE AND A LIGHTING DEVICE COMPRISING A LIGHT GUIDE

CROSS-REFERENCE TO PRIOR APPLICATIONS

This application is the U.S. National Phase application under 35 U.S.C. § 371 of International Application No. PCT/EP2020/062238, filed on MAY 4, 2020, which claims the benefit of European Patent Application No. 19172985.4, filed on MAY 4, 2019. These applications are hereby incorporated by reference herein.

TECHNICAL FIELD

The present invention relates to a light guide comprising at least a first group and a second group of conically shaped outcoupling surface structures, which are configured for coupling of light out of the light guide.

BACKGROUND

The use of light guides in suspended lighting devices and luminaires in different applications, such as in an office environment, are known. Light emitted from a light source such as a light emitting diode (LED) based lamp may be incoupled into a light guide. The light in the light guide can for example be outcoupled in an upward direction (e.g., towards the ceiling of a room) and in a downward direction (e.g., towards the floor of a room). Thereby, the need for multiple lighting devices or luminaires for achieving both light in an upward direction and in a downward direction may be reduced or even eliminated. The light in the different directions may have different purposes. The purpose of the upwardly directed light may be to provide general lighting of a larger space, e.g., a room, while the purpose of the downwardly directed light may be to illuminate a smaller space below the lighting device or luminaire, such as a desk or a work space. To this end, an optical component may be provided below and at a distance from the light guide to collimate the light into a light beam having desired or required light characteristics.

One concept includes LEDs arranged on opposite edges of a generally plate-shaped light guide for incoupling of light into the light guide. A reflector is provided adjacent a top surface of the light guide and an optical foil is provided at a distance from a bottom surface of the light guide for collimating the light outcoupled from the light guide.

Solutions according to, or similar to, the concept mentioned above are often able to produce an upwardly directed light beam and a downwardly directed light beam with the desired or required light characteristics. However, the optical foil may be relatively expensive, and may add to the complexity of the process of manufacturing the lighting device or luminaire, and may also possibly increase the bulkiness of the lighting device or luminaire.

SUMMARY

In view of the above discussion, a concern of the present invention is to provide a light guide, which light guide may be used in for example a lighting device and may facilitate or allow for the lighting device being capable of emitting an upwardly directed light beam and a downwardly directed light beam with the desired or required light characteristics with less or even no need of providing additional components, such as an optical foil for collimating the light outcoupled from the light guide, in the lighting device.

To address at least one of this concern and other concerns, a light guide and a lamp, luminaire or lighting system in accordance with the independent claims are provided. Preferred embodiments are defined by the dependent claims.

According to a first aspect of the present invention, a light guide for a lighting device is provided. The light guide comprises an incoupling element configured for receiving light and coupling the received light into the light guide. The light guide is configured to convey the received light within the light guide. The light guide comprises at least a first group and a second group of conically shaped outcoupling surface structures distributed on, and recessed into or protruding from, a side of the light guide. Each conically shaped outcoupling surface structure is configured for coupling of light (e.g., light impinging thereon) out of the light guide. Each conically shaped outcoupling surface structure of the first group is geometrically characterized by a shape in accordance with a first cone or conical frustum and each conically shaped outcoupling surface structure of the second group is geometrically characterized by a shape in accordance with a second cone or conical frustum. The first cone or conical frustum has a height different from a height of the second cone or conical frustum. The first cone or conical frustum has a base diameter different from a base diameter of the second cone or conical frustum. The first cone or conical frustum has a height to base diameter ratio in a range of 0.4 to 0.7. The second cone or conical frustum has a height to base diameter ratio in a range of 0.7 to 1.4.

The light guide may be configured so as to be able to convey the received light within the light guide by means of total internal reflection. The conically shaped outcoupling surfaces structures may be recessed into (e.g., indented into) and/or protruding from a side of the light guide. The conically shaped outcoupling surfaces structures may be arranged, realized or implemented as recesses, indents or protrusions. The conically shaped outcoupling surfaces structures may be regularly or irregularly distributed on the side of the light guide. The area of side of the light guide on which the conically shaped outcoupling surfaces structures are distributed may constitute a majority (e.g., 70%, 80%, or 90% or more) of the total area of the side of the light guide. The light guide may for example have a shape according to a plate, or a sheet, wherein the side of the light guide may be one of the two largest sides of the light guide that are opposite to each other. The coupling of light out of the light guide by a conically shaped outcoupling surface structure may be at any angle to a side of the light guide at which the light is coupled out of the light guide. Conically shaped outcoupling surface structures may provide outcoupling of light at grazing or near perpendicular angles to a side of the light guide at which the light is coupled out of the light guide. The outcoupling of light at different angles may create a softer light as perceived by a viewer at a distance from the light guide and/or a lighting device in which the light guide may be comprised. The light outcoupled by a conically shaped outcoupling surface structure of a first group with a shape in accordance with a first cone or conical frustum may have certain characteristics due to its geometrical characterization. The light outcoupled by a conically shaped outcoupling surface structure of the second group with a shape in accordance with a second cone or conical frustum may have certain characteristics due to its geometrical characterization, which may be different from the characteristics of the light outcoupled by a conically shaped outcoupling surface structure of the first group with a shape in accordance with a first cone or conical frustum. The difference in characteristics of the light outcoupled by a conically shaped outcoupling surface structure of the first group and the light outcoupled by a conically shaped outcoupling surface structure of the second group may allow for a more controllable outcoupling of light from the light guide. The outcoupling of light from the light guide may therefore be able to tuned to certain specifications or requirements. The specifications or requirements may include a required or desired distribution of the light coupled out of the light guide (e.g., the luminous flux, or intensity, distribution of the light coupled out of the light guide). A light guide comprising at least the first and second groups of conically shaped outcoupling surface structures may allow for distributions of the light coupled out of the light guide which may not be possible if the light guide would comprise only the first or the second group of conically shaped outcoupling surface structures. The distribution of the light coupled out of the light guide may have a certain shape, wherein the shape may be dependent on the geometrical characteristics of the at least two groups of conically shaped outcoupling surface structures. The distribution of the light coupled out of the light guide may for example have a batwing shape. The light coupled out of the light guide by the at least two groups of conically shaped outcoupling surface structures may exhibit a relatively low glare. The difference in geometrical characterization between a first cone or conical frustum and a second cone or conical frustum may be a height. A first cone or conical frustum may have a first height and a second cone or conical may have a second height, wherein the first height may be different from the second height.

In the context of the present application, by a conically shaped outcoupling surface structure (e.g., of the first group or second group) being geometrically characterized by a shape in accordance with a cone or conical frustum (e.g., the first cone or conical frustum, or the second cone or conical frustum), it is not necessarily meant that the conically shaped outcoupling surface structure has a shape that is exactly that of a cone or conical frustum (but it may have). It is to be understood that the conically shaped outcoupling surface structure may have a shape that that is resembling or approximating a cone or conical frustum, and hence that (e.g., relatively small) deviations from a shape that is exactly that of a cone or conical frustum may be possible.

The incoupling element may for example comprise an edge or a facet of the light guide. The light guide may comprise any number of incoupling elements, such as one, two, three, four or more. For example, the light guide may comprise two, three, four or more edges configured as incoupling elements. Any two edges configured as incoupling elements may be arranged opposite to each other.

It is to be understood that the light guide could comprise one or more additional groups of conically shaped outcoupling surface structures, such as, for example, a third group of conically shaped outcoupling surface structures. The light guide could comprise a plurality of groups of conically shaped outcoupling surface structures. Any additional (e.g., a third) group of conically shaped outcoupling surface structures may be distributed on, and recessed into or protruding from, the side of the light guide. Each conically shaped outcoupling surface structure of any additional group (e.g., a third) group may be geometrically characterized by a shape in accordance with an additional (e.g., a third) cone or conical frustum. The additional (e.g., a third) cone or conical frustum may have a height different from the height of the first cone or conical frustum and/or the height of the second cone or conical frustum. The additional (e.g., a third) cone or conical frustum may have another geometrical parameter other than height different from the other geometrical parameter of the first cone or conical frustum and/or the other geometrical parameter of the second cone or conical frustum.

A method for producing or manufacturing a light guide for a lighting device comprises providing a light guide. The method comprises forming at least a first group and a second group of conically shaped outcoupling surface structures that are distributed on, and recessed into or protruding from, a side of the light guide. Each conically shaped outcoupling surface structure is configured for coupling of light out of the light guide. The at least a first group and a second group of conically shaped outcoupling surface structures are formed such that each conically shaped outcoupling surface structure element of the first group is geometrically characterized by a shape in accordance with a first cone or conical frustum and each conically shaped outcoupling surface structure of the second group is geometrically characterized by a shape in accordance with a second cone or conical frustum. The first cone or conical frustum has a height different from a height of the second cone or conical frustum. The first cone or conical frustum has a base diameter different from a base diameter of the second cone or conical frustum. The first cone or conical frustum has a height to base diameter ratio in a range of 0.4 to 0.7. The second cone or conical frustum has a height to base diameter ratio in a range of 0.7 to 1.4.

The conically shaped outcoupling surface structures may be formed by pressing a provided light guide with a side of a tool having a shape corresponding to the desired conically shaped outcoupling surface structures, so as to for example form indentations in a side of the light guide, by which indentations the conically shaped outcoupling surfaces structures may be realized. In alternative or in addition, the light guide may be formed by mold casting in a mold having a shape corresponding to the desired conically shaped outcoupling surface structures, whereby outcoupling surface structures such as described in the foregoing on a side of the light guide may be formed. In alternative or in addition, the light guide may be formed by removing light guide material from a side of the light guide, so as to form outcoupling surface structures such as described in the foregoing on the side of the light guide. Removing light guide material may comprise lathing, drilling and/or boring.

The characteristics of light outcoupled by a conically shaped outcoupling surface structure may be dependent on the shape by which it is geometrically characterized.

Base diameter may be a geometrical parameter characterizing the shape of the conically shaped outcoupling surface structure. The base diameter may define the diameter of the (circular) base of a cone or conical frustum (e.g., the first cone or conical frustum or the second cone or conical frustum). The base of the cone or conical frustum may be perpendicular to a central axis of the cone or conical frustum. The first cone or conical frustum may be a right circular cone or conical frustum. The second cone or conical frustum may be a right circular cone or conical frustum. By the first cone or conical frustum and the second cone or conical frustum having different base diameters, distributions of conically shaped outcoupling surface structures on a side of the light guide may be facilitated or allowed that would otherwise (i.e. if the first cone or conical frustum and the second cone or conical frustum would have the same base diameter) be unsuitable or difficult to achieve.

The first cone or conical frustum has a height to base diameter ratio in a range of 0.4-0.7, for example in a range of 0.475-0.65, or 0.48-0.65. The second cone or conical frustum has a height to base diameter ratio in a range of 0.7-1.4, for example in a range of 0.9-1.25, or 0.9-1.3.

As already mentioned in the foregoing, the characteristics of light outcoupled by a conically shaped outcoupling surface structure may be dependent on the shape by which it is geometrically characterized. A height to base diameter ratio may be a geometrical parameter characterizing the shape of the conically shaped outcoupling surface structure. An intensity or luminous flux distribution of the light coupled out of the light guide may be dependent on the height to base diameter ratio of the conically shaped outcoupling surface structures. A first cone or conical and frustum with a different height to base diameter ratio than the height to base diameter ratio of a second cone or conical frustum may facilitate or allow for achieving an intensity or luminous flux distribution of the light coupled out of the light guide that conforms with a desired or required intensity or luminous flux distribution of a particular application, such as, for example, office lighting. For example, the combination of a first cone or conical frustum having a height to base diameter ratio in a range of 0.4-0.7 and a second cone or conical frustum having a height to base diameter ratio in a range of 0.7-1.4 may facilitate or allow for achieving an intensity or luminous flux distribution of the light coupled out of the light guide that conforms with an intensity or luminous flux distribution that may be desired or required for example in office lighting applications. The combination of a first cone or conical frustum having a height to base diameter ratio in a range of 0.475-0.65, or 0.48-0.65, and a second cone or conical frustum having a height to base diameter ratio in a range of 0.9-1.25, or 0.9-1.3, may facilitate or allow for achieving an intensity distribution of the light coupled out of the light guide that produces relatively little glare and/or that conforms relatively well with an intensity distribution that may be desired or required for example in office lighting applications.

The first cone or conical frustum may for example have a height to base diameter ratio of 0.56, or approximately 0.56. The second cone or conical frustum may have a height to base diameter ratio of 1.07, or approximately 1.07.

The combination of a first cone or conical frustum having a height to base diameter ratio of (approximately) 0.56 and a second cone or conical frustum having a height to base diameter ratio of (approximately) 1.07 may be a combination that facilitates or allows for achieving an intensity distribution of the light coupled out of the light guide that produces very little or minimal glare and/or that conforms very closely or even entirely with an intensity distribution that may be desired or required for example in office lighting applications.

Each conically shaped outcoupling surface structures of the first group may be geometrically characterized by a shape in accordance with a first conical frustum and each conically shaped outcoupling surface structures of the second groups may be geometrically characterized by a shape in accordance with a second conical frustum. The first conical frustum may have a top diameter different from a top diameter of the second conical frustum.

As already mentioned in the foregoing, the characteristics of light outcoupled by a conically shaped outcoupling surface structure may be dependent on the shape by which it is geometrically characterized. The characteristics of light outcoupled by a conically shaped outcoupling surface structure may for example comprise the luminous flux or intensity distribution of the outcoupled light. The geometrical characterization of the shape of a conically shaped outcoupling surface structure may be defined by height, base diameter and/or top diameter. The top diameter may define the diameter of the circular top of a cone or conical frustum, which circular top may be perpendicular to a central axis of the cone or conical frustum. For any conically shaped outcoupling surface structure geometrically characterized by a shape in accordance with a conical frustum, the top diameter may be smaller than the base diameter.

The outcoupling surface structures (e.g., the first group and/or the second group of conically shaped outcoupling surface structures) may for example be distributed according to a selected pattern on the side of the light guide.

The outcoupling surface structures may be distributed according to a pattern which fits as many outcoupling surface structures as possible on a side of the light guide. The selected pattern may be columns and rows of outcoupling surface structures on the side of the light guide. Every other column or row may be shifted a distance with regards to the remaining columns or rows. The shift distance may be half, or approximately the half, of the base diameter of a cone or conical frustum by which the shape of the outcoupling surface structures may be geometrically characterized.

The number of conically shaped outcoupling surface structures in the first group may be a selected fraction of the number of conically shaped outcoupling surface structures in the second group.

The number of conically shaped outcoupling surface structures in the first group in relation to the number of conically shaped outcoupling surface structures in the second group, or vice versa, may influence the characteristics of light coupled out of the light guide, which may comprise, but is not limited to, the distribution of the light coupled out of the light guide (e.g., the luminous flux, or intensity, distribution of the light coupled out of the light guide).

The selected fraction may be within a range of 0.2-0.7, for example 0.25-0.5. The selected fraction could be within a range of 0.3-0.7, or 0.4-0.7.

By the selected fraction being within a range of 0.2-0.7, or 0.3-0.7 or 0.4-0.7, it may be facilitated or allowed for achieving characteristics of light coupled out of the light guide that conforms relatively closely with requirements of characteristics of light used for illumination purposes in different applications such as, for example, office lighting applications. This may be even further facilitated by the selected fraction being within a range of 0.25-0.5.

According to a particular example, relevant for requirements of characteristics of light used for illumination purposes in for example office lighting applications, the selected fraction may be 0.38, or approximately 0.38.

Some of the outcoupling surface structures of the first group may be distributed irregularly on the side of the light guide with regards to the other outcoupling surface structures of the first group and the outcoupling surface structures of the second group. The term irregularly may in this context be interpreted as sporadically or intermittently. The outcoupling surface structures of one of the groups (e.g., the first group) may be interspersed amongst the outcoupling surface structures of another group (e.g., the second group). The distribution of one group (e.g., the first group, or the second group) of outcoupling surface structures may be approximately in accordance with a white noise distribution. Some of the outcoupling surface structures of the first group may be distributed on the side of the light guide with regards to the other outcoupling surface structures of the first group and the outcoupling surface structures of the second group according to a selected pattern. The pattern may cause the light coupled out from the light guide to project a particular shape on a surface onto which the outcoupled light impinges. The projected shape may for example comprise text and/or a logo, or any other possible 2D shape.

The light guide may, in addition to the above-mentioned side on which the at least a first group and a second group of conically shaped outcoupling surface structures are distributed, comprise another side, which may be arranged opposite to the first mentioned side. The other side may be configured for coupling of light out of the light guide. The first mentioned side may be referred to as a first side of the light guide, and the other side may be referred to as a second side of the light guide.

Light coupled out of the other side of the light guide may comprise characteristics different from the light coupled out of the first mentioned side. The characteristics may comprise the distribution of the light coupled out of the light guide (e.g., the luminous flux, or intensity, distribution of the light coupled out of the light guide).

The light guide may for example have a shape according to a plate, a sheet or a cuboid.

The light guide may for example comprise at least six sides. At least two sides (e.g., the first and second sides mentioned in the foregoing) of the light guide may be arranged opposite each other and may be configured for outcoupling of light. At least one of the other four sides of the light guide may be configured as incoupling elements. The sides of the light guide configured for outcoupling of light may be larger than the side(s) of the light guide configured as incoupling element(s). The light guide may for example have a shape according to a plate, a sheet or a cuboid, which may be curved or bent.

The lighting device may for example comprise or be constituted by a lamp, a luminaire or lighting system. Thus, the light guide may for example be comprised in a lamp, a luminaire or lighting system.

The lamp, luminaire or lighting system may comprise means for arranging the lamp, luminaire or lighting system in a desired position, e.g., in a room. The lamp, luminaire or lighting system may for example be suspended from a ceiling in a room. The means may for example comprise wires, a shaft, an arm or at least one hanger.

The lamp, luminaire or lighting system may comprise at least one light source. The light source may be configured to emit light incoupling into the light guide. The at least one light source may for example comprise one or more LED light sources.

The lamp, luminaire or lighting system may comprise a driver unit, e.g., for driving or controlling operation of the at least one light source. The driver unit may comprise power electronics.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the invention will be described below with reference to the accompanying drawings.

Figure 1:
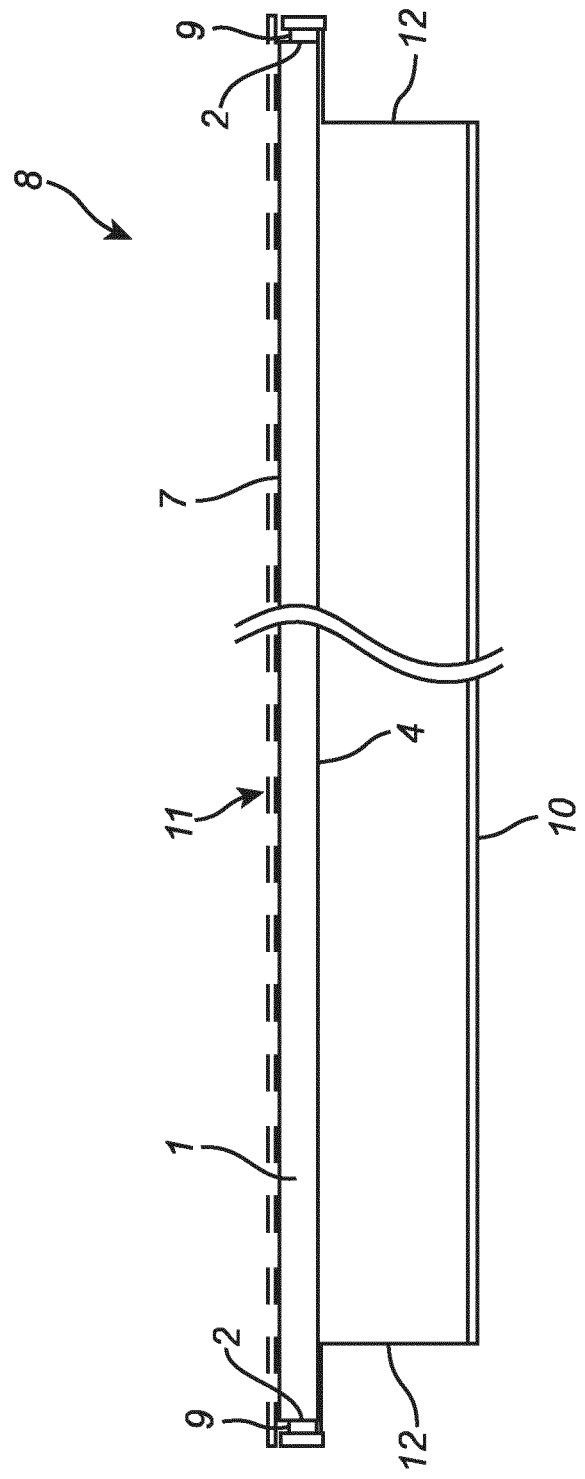
FIG. 1 is schematic view of a cross-section of a lighting device perpendicular to a longitudinal axis of the lighting device.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art. In the drawings, identical reference numerals denote the same or similar components having a same or similar function, unless specifically stated otherwise.

FIG. 1 is schematic view of a cross-section of a lighting device 8 perpendicular to a longitudinal axis of the lighting device 8, according to one or more exemplifying embodiments of the present invention. The lighting device 8 comprises a light guide 1. Further, the lighting device 8 may comprise two light sources 9 configured to emit light for incoupling into the light guide 1. It should be noted that a configuration including two light sources 9 is exemplifying, and that the lighting device 8 could in principle comprise any number of light sources 9, such as one, two, three, four or more. In accordance with the embodiment illustrated in FIG. 1, the light guide 1 may comprise two incoupling elements 2 configured for receiving light emitted by the respective ones of the two light sources 9 and coupling the received light into the light guide 1, but it is however to be understood that there could be any other number of incoupling elements 2, such one, three, four or more. Each or any of the light sources 9 may for example comprise one or more LEDs, or one or more so called LED strips. In accordance with the embodiment illustrated in FIG. 1, the light guide 1 has a shape according to a plate, and the incoupling elements 2 are constituted by edges of the light guide 1. The thickness of the light guide 1 may for example between 5 mm and 10 mm, such as, for example, 6 mm or approximately 6 mm. The light guide 1 is configured to convey the received light within the light guide 1. The light guide 1 may comprise at least a first group and a second group of conically shaped outcoupling surface structures 3 (not shown in FIG. 1; see FIGS. 4 and 5) distributed on and recessed into or protruding from a side 4 of the light guide 1, wherein each conically shaped outcoupling surface structure 3 is configured for coupling of light out of the light guide 1. The light guide 1 may comprise, in addition to side 4 of the light guide 1, another side 7 of the light guide 1, which other side 7 may be arranged opposite to the side 4 of the light guide 1, as illustrated in FIG. 1. The other side 7 of the light guide 1 may be configured for coupling of light out of the light guide 1. In accordance with the embodiment illustrated in FIG. 1, the edges of the light guide 1 which are constituting the incoupling elements 2 are perpendicular, or substantially perpendicular, to the sides 4 and 7. In accordance with the embodiment illustrated in FIG. 1, the lighting device 8 may comprise a light exit window 10 arranged below and at a distance from the side 4 of the light guide 1. Light outcoupled from the light guide 1 may be emitted from the lighting device 8 via the light exit window 10. The light exit window 10 may be transparent. The light exit window 10 may possibly have a frosted appearance. The lighting device 8 may comprise a reflector 11, which may be perforated. By the reflector 11 being perforated, some of the light outcoupled from the light guide 1 may be coupled out via the side 7. The reflector 11 may be arranged adjacent to the side 7 of the light guide 1. The reflector 11 may be configured to reflect some of the light outcoupled via the side 7 of the light guide 1 back towards the light guide 1. The reflector 11 may be configured to alter the shape of the light outcoupled via the side 4 of the light guide. It is to be understood that the reflector 11 may be omitted. Depending on particular specifications or requirements of the light emitted by the lighting device 8, the reflector 11 may be included in the lighting device 8, or may be omitted from the lighting device 8. Further in accordance with the embodiment illustrated in FIG. 1, the lighting device 8 may comprise one or more specular reflectors 12. The specular reflectors 12 may be connected with the light exit window 10, as illustrated in FIG. 1.

Figure 2:
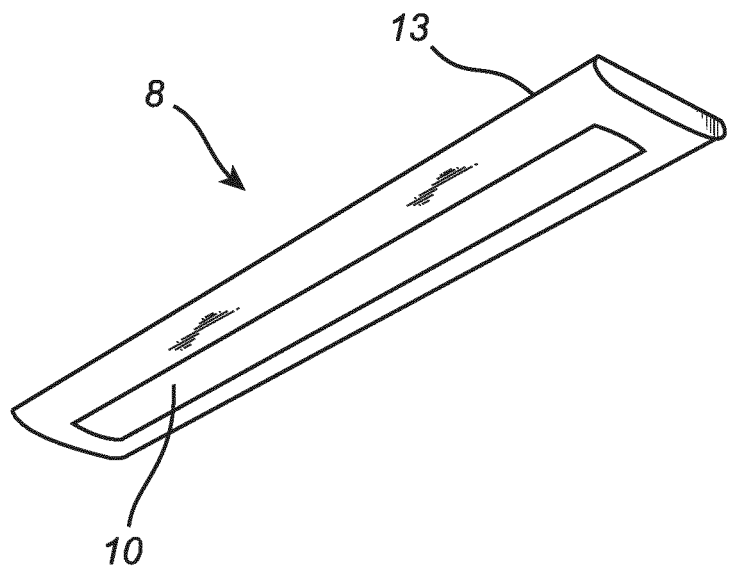
FIG. 2 is a schematic view of a lighting device.

FIG. 2 is a schematic view of a lighting device 8 according to an exemplifying embodiment of the present invention. The lighting device 8 illustrated in FIG. 2 may be similar to the lighting device 8 illustrated in FIG. 1. The lighting device 8 comprises a light guide (not shown in FIG. 2; cf., e.g., FIG. 1). The lighting device 8 may comprise a housing 13. The lighting device 8 may comprise a light exit window 10. In accordance with the exemplary embodiment illustrated in FIG. 2, the light guide may be arranged behind the light exit window 10. The lighting device 8 may comprise at least one driver unit (not shown in FIG. 2). The driver unit may be coupled to at least one light source (not shown in FIG. 2; see FIG. 1), which may be comprised in the lighting device 8, and which may be configured to emit light for incoupling into the light guide. The driver unit may be configured to drive or control operation of the at least one light source.

Figure 3:
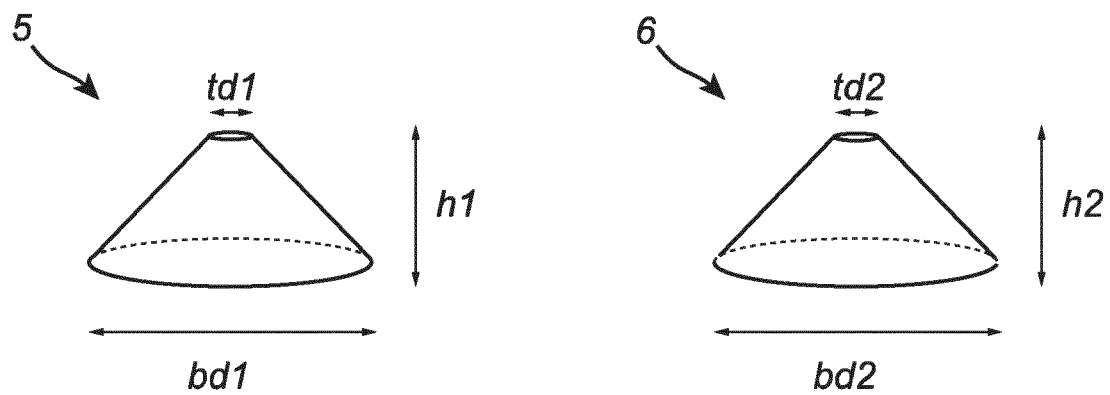
FIG. 3 is a schematic view of geometric shapes of conically shaped outcoupling surface structures.

FIG. 3 is a schematic view of geometric shapes of conically shaped outcoupling surface structures 3 according to an exemplifying embodiment of the present invention, which conically shaped outcoupling surface structures may be distributed on a side of a light guide according to one or more embodiments of the present invention, such as, for example, the light guide 1 illustrated in FIG. 1. The light guide 1 (not shown in FIG. 3; see FIGS. 1, 2, 4 and 5) may comprise at least a first group and a second group of conically shaped outcoupling surface structures 3 (not shown in FIG. 3; see FIGS. 4 and 5) distributed on, and recessed into or protruding from, a side of the light guide 1 (not shown in FIG. 3; see FIGS. 1, 4 and 5). Each conically shaped outcoupling surface structure 3 may be configured for coupling of light out of the light guide 1. Further, each conically shaped outcoupling surface structure 3 of the first group may be geometrically characterized by a shape in accordance with a first cone or conical frustum 5 and each conically shaped outcoupling surface structure 3 of the second group may be geometrically characterized by a shape in accordance with a second cone or conical frustum 6. The first cone or conical frustum 5 may have a height h1 different from a height h2 of the second cone or conical frustum 6. It should be noted that the geometrical shapes illustrated in FIG. 3 are exemplary, and is not limited to the shape of a conical frustum and could in principle comprise any conical shape, such as a cone, which may be a right circular cone or an oblique circular cone. The first cone or conical frustum 5 may have a base diameter bd1 different from a base diameter bd2 of the second cone or conical frustum 6. The first cone or conical frustum 5 may have a height h1 to base diameter bd1 ratio in a range of 0.4-0.7. The second cone or conical frustum 6 may have a height h2 to base diameter bd2 ratio in a range of 0.7-1.4. The first cone or conical frustum 5 may have a height h1 to base diameter bd1 ratio of 0.56. The second cone or conical frustum 6 may have a height h2 to base diameter bd2 ratio of 1.07. The first conical frustum 5 may have a top diameter td1 different from a top diameter td2 of the second conical frustum 6. The first cone or conical frustum 5 may have at least one angle defining an angle between a central axis of the first cone or conical frustum 5 and the base of the first cone or conical frustum 5. The second cone or conical frustum 6 may have at least one angle defining an angle between a central axis of the second cone or conical frustum 6 and the base of the first cone or conical frustum 6. The at least one angle of the first cone or conical frustum 5 may be different from the at least one angle of the second cone or conical frustum 6.

Figure 4:
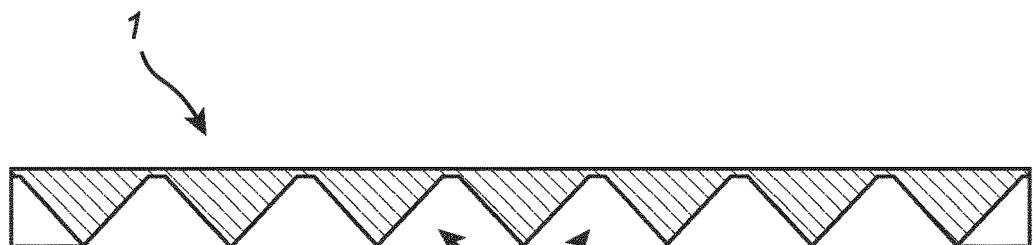
FIG. 4 is schematic view of a portion of a cross-section of a light guide perpendicular to a longitudinal axis of the light guide.

FIG. 4 is schematic view of a portion of a cross-section of a light guide 1 perpendicular to a longitudinal axis of the light guide 1, according to one or more exemplifying embodiments of the present invention. The light guide 1 may comprise at least a first group and a second group of conically shaped outcoupling surface structures 3. The conically shaped outcoupling surface structures 3 may be distributed on, and recessed into or protruding from, a side 4 of the light guide 1. In accordance with the embodiment illustrated in FIG. 4, the conically shaped outcoupling surface structures 3 are recessed (e.g., indented) into the side 4 of the light guide 1. Each conically shaped outcoupling surface structure 3 may be configured for coupling of light out of the light guide 1. Each conically shaped outcoupling surface structure 3 of the first group may be geometrically characterized by a shape in accordance with a first cone or conical frustum 5 (not shown in FIG. 4; see FIGS. 3 and 5) and each conically shaped outcoupling surface structure 3 of the second group may be geometrically characterized by a shape in accordance with a second cone or conical frustum 6 (not shown in FIG. 4; see FIGS. 3 and 5). Some of the outcoupling surface structures 3 of the first group may be distributed irregularly on the side 4 of the light guide 1 with regards to the other outcoupling surface structures 3 of the first group and the outcoupling surface structures 3 of the second group.

Figure 5:
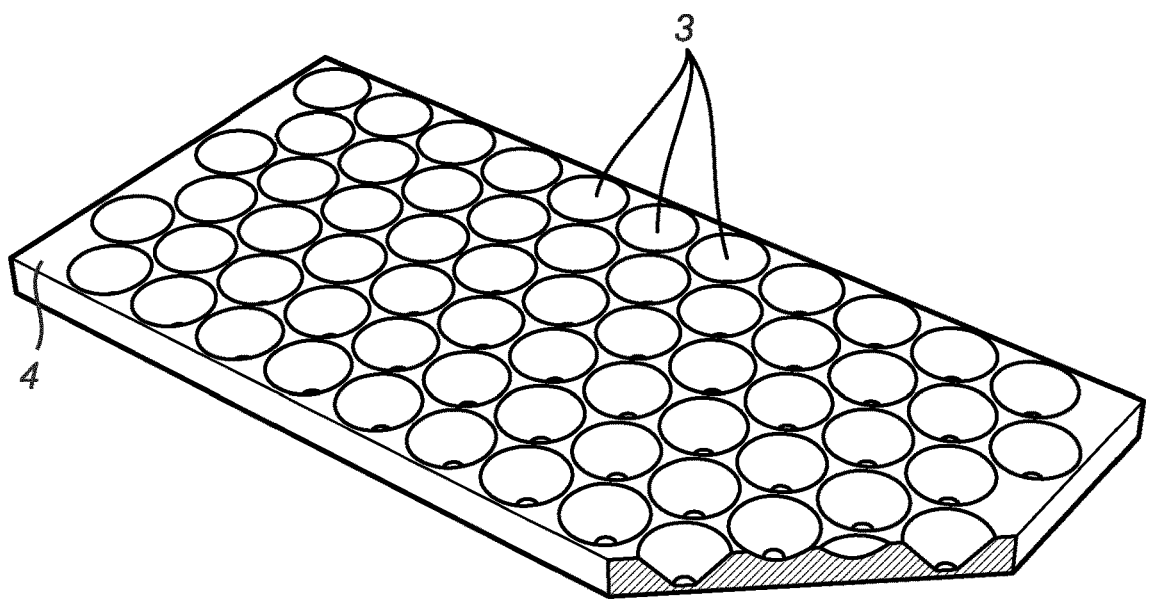
FIG. 5 is schematic view of a portion of a light guide.

FIG. 5 is a very schematic view of a portion of a light guide 1 according to one or more exemplifying embodiments of the present invention. In accordance with the embodiment illustrated in FIG. 5, the light guide 1 may have a shape according to a plate, a sheet or a cuboid. It is however to be understood that the light guide 1 could have another geometrical shape. The light guide 1 comprises conically shaped outcoupling surface structures 3, of which only a few are indicated by reference numerals 3 in FIG. 5. It is to be understood that the number of conically shaped surface structures 3 illustrated in FIG. 5 is according to an example, and that the light guide 1 may in principle have any number of conically shaped surface structures. The outcoupling surface structures 3 may be distributed according to a selected pattern on the side 4 of the light guide 1. The selected pattern may be columns and rows of outcoupling surface structures 3 on the side 4 of the light guide 1. Every other column or row may be shifted a distance with regards to the remaining columns or rows. The shift distance may be half, or approximately half, of the base diameter bd1, bd2 of a cone or conical frustum (cf. FIG. 3) by which the shape of the outcoupling surface structures 3 may be geometrically characterized. The selected pattern is not limited to the illustration shown in FIG. 5. The pattern may for example be a hexagonal pattern. Some of the outcoupling surface structures 3 of the first group may be distributed irregularly on the side 4 of the light guide 1 with regards to the other outcoupling surface structures 3 of the first group and the outcoupling surface structures 3 of the second group. The number of conically shaped outcoupling surface structures 3 in the first group may be a selected fraction of the number of conically shaped outcoupling surface structures 3 in the second group. The selected fraction may be in a range of 0.3-0.7, and may for example be 0.38, or approximately 0.38. The selected fraction could be in a range of 0.4-0.7.

Figure 6:
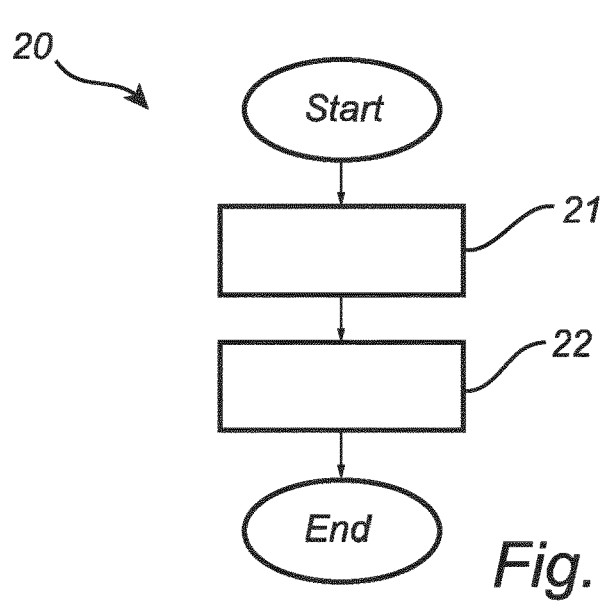
FIG. 6 is a schematic flowchart of a method for manufacturing a light guide for a lighting device.

FIG. 6 is a schematic flowchart of a method 20 for manufacturing a light guide for a lighting device according to an exemplifying embodiment of the present invention.

The method 20 comprises providing a light guide, 21.

The method 20 comprises forming at least a first group and a second group of conically shaped outcoupling surface structures that are distributed on, and recessed into or protruding from, a side of the light guide, 22. Each conically shaped outcoupling surface structure is configured for coupling of light out of the light guide. The at least a first group and a second group of conically shaped outcoupling surface structures are formed such that each conically shaped outcoupling surface structure element of the first group is geometrically characterized by a shape in accordance with a first cone or conical frustum and each conically shaped outcoupling surface structure of the second group is geometrically characterized by a shape in accordance with a second cone or conical frustum. The first cone or conical frustum has a height different from a height of the second cone or conical frustum. The method 20 may then end.

In conclusion, a light guide for a lighting device is disclosed. The light guide comprises an incoupling element configured for receiving light and coupling the received light into the light guide, wherein the light guide is configured to convey the received light within the light guide. The light guide comprises at least a first group and a second group of conically shaped outcoupling surface structures distributed on, and recessed into or protruding from, a side of the light guide, wherein each conically shaped outcoupling surface structure is configured for coupling of light out of the light guide. Each conically shaped outcoupling surface structure of the first group is geometrically characterized by a shape in accordance with a first cone or conical frustum and each conically shaped outcoupling surface structure of the second group is geometrically characterized by a shape in accordance with a second cone or conical frustum, wherein the first cone or conical frustum may have a height different from a height of the second cone or conical frustum.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A light guide for a lighting device, the light guide comprising:
   an incoupling element configured for receiving light and coupling the received light into the light guide, wherein the light guide is configured to convey the received light within the light guide; and
   at least a first group and a second group of conically shaped outcoupling surface structures distributed on, and recessed into or protruding from, a side of the light guide, wherein each conically shaped outcoupling surface structure is configured for coupling of light out of the light guide;
   wherein each conically shaped outcoupling surface structure of the first group is geometrically shaped in accordance with a first cone or conical frustum and each conically shaped outcoupling surface structure of the second group is geometrically shaped in accordance with a second cone or conical frustum,
   wherein the first cone or conical frustum has a height different from a height of the second cone or conical frustum,
   wherein the first cone or conical frustum has a base diameter different from a base diameter of the second cone or conical frustum,
   wherein the first cone or conical frustum has a height to base diameter ratio in a range of 0.4 to 0.7, and
   wherein the second cone or conical frustum has a height to base diameter ratio in a range of 0.7 to 1.4.

2. A light guide according to claim 1, wherein the first cone or conical frustum has a height to base diameter ratio of 0.56, and wherein the second cone or conical frustum has a height to base diameter ratio of 1.07.

3. A light guide according to claim 1, wherein the each conically shaped outcoupling surface structures of the first group is geometrically shaped in accordance with a first conical frustum and each conically shaped outcoupling surface structures of the second groups is geometrically shaped in accordance with a second conical frustum, wherein the first conical frustum has a top diameter different from a top diameter of the second conical frustum.

4. A light guide according to claim 1, wherein the outcoupling surface structures are distributed according to a selected pattern on the side of the light guide.

5. A light guide according to claim 1, wherein the number of conically shaped outcoupling surface structures in the first group is a selected fraction of the number of conically shaped outcoupling surface structures in the second group.

6. A light guide according to claim 1, wherein some of the outcoupling surface structures of the first group are distributed irregularly on the side of the light guide with regards to the other outcoupling surface structures of the first group and the outcoupling surface structures of the second group.

7. A light guide according to claim 1, wherein the light guide in addition to said side comprises another side arranged opposite to the first mentioned side and configured for coupling of light out of the light guide.

8. A light guide according to claim 1, wherein the light guide has a shape according to a plate, a sheet or a cuboid.

9. A lamp, luminaire or lighting system comprising a light guide according to claim 1.

10. A light guide according to claim 5, wherein the selected fraction is in a range of 0.3-0.7.

11. A light guide according to claim 10, wherein the selected fraction is 0.38.

12. A lamp, luminaire or lighting system according to claim 9, further comprising a light source configured to emit light for incoupling into the light guide.

* * * * *